April 5, 1932. W. M. JONES, JR 1,852,886
MOLD FOR RETREADING VEHICLE TIRES
Original Filed July 6, 1928
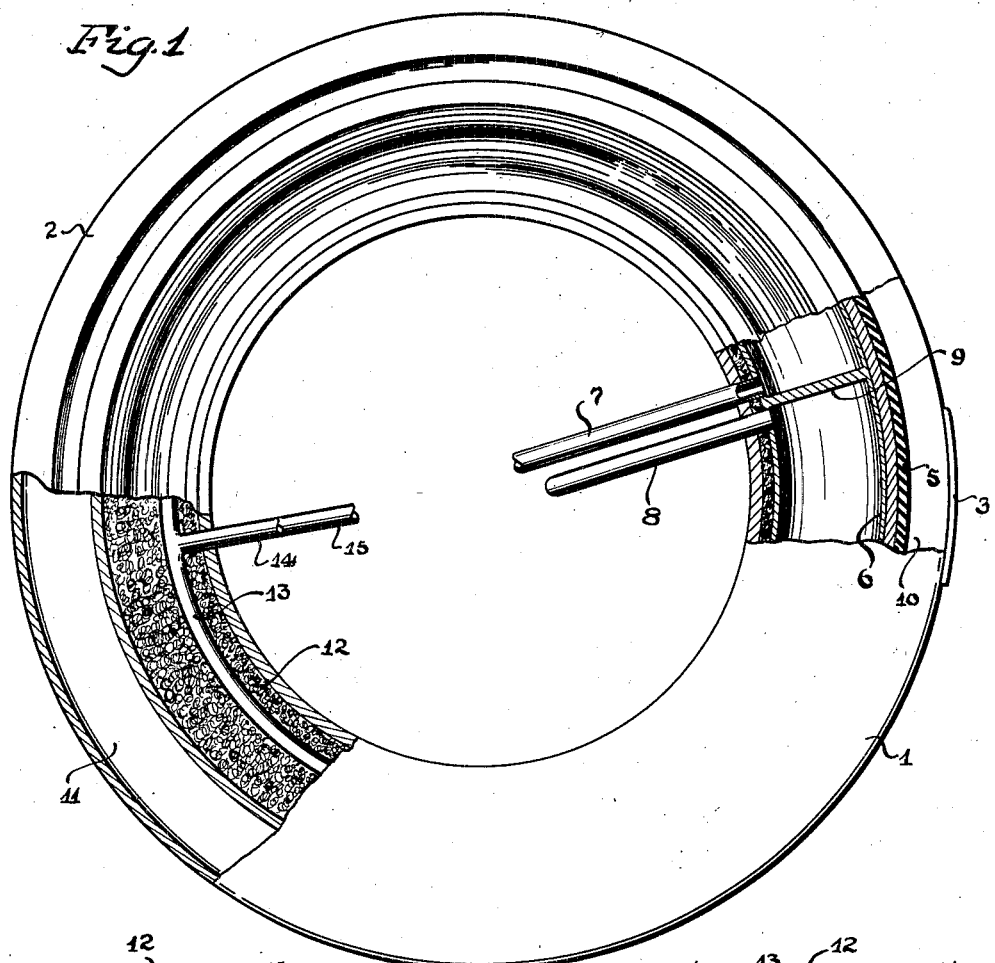
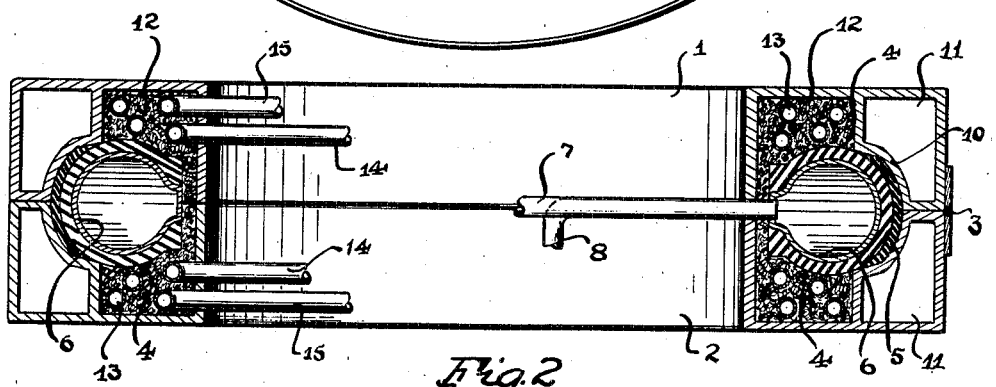
INVENTOR
William Martin Jones, Jr.
BY
his ATTORNEY Patented Apr. 5, 1932

1,852,886

UNITED STATES PATENT OFFICE

WILLIAM MARTIN JONES, JR., OF ROCHESTER, NEW YORK

MOLD FOR RETREADING VEHICLE TIRES

Application filed July 6, 1928, Serial No. 290,766. Renewed August 13, 1931.

The present invention relates to molds for retreading vehicle tires, this invention being an improvement upon the invention disclosed in my Patent No. 1,467,761 granted September 11, 1923. An object of this invention is to make it possible to maintain those portions of the mold walls away from the tread engaging portion in a cool condition.

To this and other ends, the invention consists of certain parts and combinations of parts, all of which will be hereinafter described: the novel features being pointed out in the appended claims.

In the drawings:

Fig. 1 is a plan view of a mold constructed in accordance with this invention with parts broken away to illustrate interior parts in section; and Fig. 2 is a vertical section through the mold.

In my prior patent above mentioned, the mold has the tread engaging portion of its wall of greater heat conductivity than those portions of the wall away from the tread. In the preferred embodiment, the portions of the wall of low heat conductivity were formed of asbestos or similar material. In practice it has been found that this material of low heat conductivity takes up a certain portion of the heat, and, the greater the use of the mold, the greater becomes the accumulation of the heat in this material.

It is in this invention that means has been provided for maintaining this material of low heat conductivity in a cool state.

In the drawings illustrating one embodiment of the invention, the mold is formed of two sections 1 and 2, hinged together at 3 and formed with opposed annular pockets in which the tire 4 to be retreaded is received with the tread 5. A hollow cooling core 6 is introduced into the tire before the tire is introduced into the mold and cold water through an inlet port 7 enters into this hollow core and circulates about the same, passing out at an outlet 8, the core having a partition 9 between the inlet and the outlet, whereby the circulation of the cooling fluid is insured. The mold has portions 10 engaging the tread 5 and made of material of high heat conductivity such as iron, these portions being heated in any suitable manner as by steam chambers 11 through which a circulation of steam is maintained. Those portions of the mold walls which engage the portions of the tire away from the tread are made, in this instance, of asbestos 12 which, as before stated, when the mold is used to any great extent accumulates heat.

With the end in view of maintaining these portions 12 of low heat conductivity in a cool state notwithstanding the extent of use of the mold, a cooling means is employed for such portions, this cooling means being so constructed and arranged that it does not materially affect the high heat conducting portions 10. In this instance, this cooling means consists of two coils of piping 13, one in each mold section, each having an inlet 14 and an outlet 15. These coils are embedded, in the low heat conducting material 12 and, with the circulation of cold water therethrough, maintain the material 12 in a cool state and prevent the accumulation of heat through continued use of the mold.

What I claim as my invention and desire to secure by Letters Patent is:

1. A tire retreading mold having a tread engaging portion of high heat conductivity and those tire engaging portions away from the tread engaging portion of low heat conductivity; combined with means for cooling the latter portions.

2. A tire retreading vulcanizing mold having a tread engaging portion of high heat conductivity and those tire engaging portions away from the tread engaging portion of low heat conductivity; combined with means for circulating a cooling fluid through the mold to maintain the latter portions cooled without materially affecting the temperature of the portion of high heat conductivity.

3. A tire retreading vulcanizing mold having a tread engaging portion of high heat conductivity, and material of low heat conductivity engaging other parts of the exterior of the tire combined with cooling coil embedded in such material.

4. A tire retreading mold having a tread engaging portion of high heat conductivity and those tire engaging portions away from the tread engaging portion of low heat conductivity; combined with means for cooling the latter portions and means for keeping the interior of the tire in a cool condition.

5. A tire retreading mold having a tread engaging portion of high heat conductivity, and asbestos for engaging the side walls of the tire, combined with a fluid cooling means passing through said asbestos to carry off the residual heat.

WILLIAM MARTIN JONES, Jr.